(12) United States Patent
Lundberg et al.

(10) Patent No.: US 10,219,674 B2
(45) Date of Patent: Mar. 5, 2019

(54) HOUSEHOLD APPLIANCE AND METHOD

(75) Inventors: Christian Lundberg, Bromma (SE);
Elisabetta Bari, Stockholm (SE);
Monica Celotto, Motta di Livenza (IT);
Guiseppe Dreossi, Stockholm (SE);
Sarah Tempelmann, Hamburg (DE);
Bernd Krische, Saltsjö-Boo (SE)

(73) Assignee: Electrolux Home Products Corporation N.V., Brussels (BE)

( * ) Notice: Subject to any disclaimer, the term of this patent is extended or adjusted under 35 U.S.C. 154(b) by 1137 days.

(21) Appl. No.: 14/126,280

(22) PCT Filed: Jun. 12, 2012

(86) PCT No.: PCT/EP2012/061056
§ 371 (c)(1),
(2), (4) Date: Jul. 30, 2014

(87) PCT Pub. No.: WO2012/171887
PCT Pub. Date: Dec. 20, 2012

(65) Prior Publication Data
US 2014/0366916 A1 Dec. 18, 2014

(30) Foreign Application Priority Data
Jun. 16, 2011 (EP) .................................... 11170143

(51) Int. Cl.
*A47L 15/00* (2006.01)
*A47L 15/42* (2006.01)

(52) U.S. Cl.
CPC ....... *A47L 15/4291* (2013.01); *A47L 15/0021* (2013.01); *A47L 15/0057* (2013.01);
(Continued)

(58) Field of Classification Search
None
See application file for complete search history.

(56) References Cited

U.S. PATENT DOCUMENTS 5,307,650 A * 5/1994 Mertz .................. D06F 39/006
68/12.12
5,606,878 A 3/1997 Arreghini et al.
(Continued)

FOREIGN PATENT DOCUMENTS

DE 101 56 924 A1 6/2003
DE 10 2008 029908 A 12/2009
(Continued)

OTHER PUBLICATIONS

LeChevallier, Mark W., et al. (1996). Factors Limiting Microbial Growth in Distribution Systems. AWWA Research Foundation and American Water Works Association, Retrieved from https://books.google.com (Year: 1996).*

(Continued)

*Primary Examiner* — Eric W Golightly
*Assistant Examiner* — Arlyn I Rivera-Cordero
(74) *Attorney, Agent, or Firm* — Alston & Bird LLP

(57) ABSTRACT

The present invention relates to a method of handling process water in a household appliance (1) and to a household appliance, for example a dish washer. The household appliance comprises a wash tub (3) for performing wash program cycles and a tank (5) for storing process water to be re-used in a following program cycle, the method comprising the steps of: determining (101) the type of detergent used in the household appliance with a sensor unit (7), measuring (102) the amount of detergent in the process water with the sensor unit, comparing (105) at least one sensor unit output value with a predetermined threshold value to define the quality of the process water, and storing (106) at least a part of the process water from a rinse cycle in the tank (5) when the sensor unit output value complies with the predetermined threshold value related to the quality of the process water.

20 Claims, 2 Drawing Sheets

(52) U.S. Cl.
CPC ... *A47L 2401/023* (2013.01); *A47L 2401/026* (2013.01); *A47L 2401/10* (2013.01); *A47L 2401/20* (2013.01); *A47L 2501/02* (2013.01); *A47L 2501/03* (2013.01); *A47L 2501/07* (2013.01); *A47L 2501/34* (2013.01); *Y02B 40/46* (2013.01)

(56) References Cited

U.S. PATENT DOCUMENTS

| | | | |
|---|---|---|---|
| 5,617,885 A * | 4/1997 | Centis | A47L 15/4291 |
| | | | 134/111 |
| 8,043,437 B1 * | 10/2011 | Delgado | A47L 15/0084 |
| | | | 134/18 |
| 2010/0300487 A1 * | 12/2010 | Rolek | A47L 15/0005 |
| | | | 134/10 |
| 2010/0300501 A1 * | 12/2010 | Bohac | A47L 15/4297 |
| | | | 134/56 D |
| 2012/0145195 A1 * | 6/2012 | Buser | A47L 15/0057 |
| | | | 134/18 |

FOREIGN PATENT DOCUMENTS

| | | |
|---|---|---|
| EP | 0 669 097 A2 | 8/1995 |
| EP | 0 691 099 A2 | 1/1996 |
| EP | 1 598 468 A1 | 11/2005 |

OTHER PUBLICATIONS

International Search Report and Written Opinion for Application No. PCT/EP2012/061056 dated Jul. 10, 2012.
Search Report for European Application No. 11 17 0143 dated Jan. 16, 2012, 3 pages.

* cited by examiner

HOUSEHOLD APPLIANCE AND METHOD

CROSS REFERENCE TO RELATED APPLICATIONS

This application is a national stage application filed under 35 U.S.C. 371 of International Application No. PCT/EP2012/061056, filed Jun. 12, 2012, which claims priority from European Patent Application No. 11170143.9, filed Jun. 16, 2011, each of which is incorporated by reference herein in its entirety

TECHNICAL FIELD

The present invention relates to a household appliance for washing and rinsing goods. More particularly, the invention relates to a method of handling process water in a household appliance, which household appliance comprises one or more tanks for storing rinse water to be re-used in a following wash program cycle. The invention is intended for use particularly but not exclusively in a dishwasher or a washing machine.

BACKGROUND

In water consuming household appliances, such as dishwashers and washing machines, the water consumption has decreased steadily during the last couple of years. In dishwashers the average water consumption has come down to approximately 10 liters per washing cycle. There is however an aim to reach even lower levels of water consumption. In this perspective, reusing partially the process water in a dishwasher or washing machine in a following washing cycle would be a way to achieve a significant improvement in the total water consumption. In past years a variety of solutions have been proposed. For example, in U.S. Pat. No. 5,606,878A it is described a clothes washing machine provided with a recovery tank to recover water that is discharged in one or more rinsing phases. The recovered water is then reused in the first washing or pre-washing phase in a subsequent washing cycle.

However, there are some typical problems associated with the storage of water containing at least some organic residues such as bad smell, tank fouling and hydraulic components clogging, bacteria proliferation and hygienic issues. In other proposed solutions these problems have been addressed with more or less advanced purification and/or disinfection treatments, e.g. filtration, UV or ozone treatments, for the reduction or prevention of the fouling problems.

In U.S. Pat. No. 5,307,650B a washing machine with a reservoir container for storing rinse water is disclosed. The reservoir container is provided with a germicide means which kills any bacteria or microbes that could be present in the water and inhibits further bacterial growth. The germicide means is described as being a lamp or a dispenser with germicidal fluid.

DE102008029908A discloses a water reservoir containing water that is used for different purposes in for example a dishwasher. Brine is introduced in the water reservoir for inhibition of germ and/or bacteria growth. The amount of the brine is regulated and/or controlled depending on the water quantity.

However, the described prior art arrangements for inhibiting bacteria growth in the water reservoir add complexity to the appliance. Another drawback is that an addition of a compound for inhibiting bacterial growth may have other unwanted side effects, such as affecting the goods to be cleaned, the user handling the appliance, the environment or the process in a sewage treatment plant.

Water scarcity is already a fact in several regions of the world and the ongoing climate change is most likely to aggravate the situation. Therefore, there is a need for improvements in household appliances for washing and rinsing goods to further reduce the water consumption.

SUMMARY

An object with the present invention is to provide an improved household appliance and method of handling process water in the household appliance.

A further object with the present invention is to improve water saving in a water consuming household appliance.

A still further object with the present invention is to decrease the potential hygienic problems connected to the storage of process water from a household appliance.

At least one of the above objects is achieved by a method of handling process water in a household appliance for washing and rinsing goods according to an embodiment of the invention. The household appliance comprises a wash tub for performing wash program cycles and a tank for storing process water to be re-used in a following program cycle, the method comprising the steps of:

determining the type of detergent used in the household appliance with a sensor unit, measuring the amount of detergent in the process water with the sensor unit, comparing at least one sensor unit output value with a predetermined threshold value related to the quality of the process water, and storing at least a part of the process water from a rinse cycle in the tank when the sensor unit output value complies with the predetermined threshold value related to the quality of the process water.

Further, the predetermined threshold value comprises information related to the amount of detergent dosed of the determined type.

This embodiment is based on the insight that a decision to save process water in the tank or not has to be taken based on the determined quality of that process water. This determination is done by comparing at least one sensor output value related to the type and amount of detergent dosed with a predetermined threshold value that is related to the quality of the process water. If the quality aspects on the process water are complied with, the process water to be stored is pumped to the tank. The quality aspects are mirrored by the predetermined threshold value that the measured values have to comply with.

In this way a method of handling process water from a rinse cycle in a household appliance performing washing and rinsing of goods is provided. By selectively storing at least a part of the process water with a determined quality from a rinse cycle, cold or hot, the risk of bad smell and bacteria proliferation is minimized for a defined period of time with a minimum of complexity added to the appliance.

An advantage with the method is that it would result in significant water saving of up to 3 liters per performed wash program with a reduced risk to experience bad smell from the household appliance caused by bacteria proliferation in the tank.

As a result, at least one of the above mentioned objects are achieved.

In another embodiment, the method also comprises the step of measuring the amount of soil in the process water with the sensor unit.

Further, in this embodiment the predetermined threshold value further comprises information related to the amount of soil in the process water.

In this embodiment the amount of soil in the process water is further measured. By combining the sensor unit output value of the determined type of detergent and the amount of detergent with the output sensor value related to the amount of soil in the process water, it may be determined if also the hot rinse water is suitable to be at least partly stored in the tank for re-use. Although the previous embodiment described above would produce a significant water saving of up to 3 liters, the water saving may be further improved by the combined storage and re-use of the cold rinse and of the hot rinse water, when specific conditions are verified.

In an embodiment, the method comprises the step of
determining the presence of rinse aid in the process water.
Further, the predetermined threshold value further comprises information related to the presence of rinse aid in the process water of a hot rinse cycle.

In an embodiment, the method comprises the further step of
adding an amount of detergent to the water tank comprising stored process water.

In a further embodiment, the method comprises the further step of
starting a time calculation when process water to be stored is pumped to the tank.

Experimental data has shown that the quality of the water that is stored in the tank will change over time. Therefore, it is an advantage to keep track of how long time the process water is actually stored in the tank. Depending on the water quality, a preferred maximum storage time may be pre-set.

In an embodiment, the method comprises the further step of
reusing the process water stored in the tank in a following program cycle being a pre-wash cycle or a main wash cycle.

In another embodiment, the method comprises further step of
discarding process water stored in the tank after a predetermined time has passed.

Further, the process water being stored in the tank is discarded when more than 48 hours have passed since the start of the time calculation.

In another embodiment, the method comprises the further step of
cleaning the tank by circulating process water from a main wash cycle and/or fresh water through the tank.

In this way the tank may be cleaned from residues that perhaps remain in the tank after it has been emptied.

In a further aspect of the invention, at least one of the above mentioned objects is achieved by a household appliance, for example a dish washer, for washing and rinsing goods. The dish washer comprises a wash tub for performing wash program cycles and a tank for storing process water to be re-used in a following cycle, wherein the dish washer comprises a sensor unit arranged to measure and determine the type and amount of detergent in the process water according to the above described method. Further, the sensor unit comprises at least one of a conductivity sensor and a turbidity sensor.

By the expression "process water" as used herein, is meant a liquid containing mainly water that is used in and circulates in a water consuming household appliance for washing and rinsing goods. The process water is water that may contain detergent and/or rinse aid in a varying amount. The process water may also contain soil, such as food debris or other types of solid particles, as well as dissolved liquids or compounds. Process water used in a main wash cycle is sometimes referred to as the wash liquid. Process water used in a rinse cycle is sometimes referred to as cold rinse or hot rinse depending on the temperature in the rinse cycle.

By the expression "quality of the process water" as used herein, is meant an indication of to what degree bacteria growth may take place in the process water. The probability of bacteria growth in the process water depends on several different parameters. The quality of the process water may be determined by measuring and/or determining one or more of such parameters that influence the quality of the process water, such as the type of detergent used, the amount of detergent dosed, the amount of residual detergent, the presence of rinse aid and the amount of soil. These parameters further influence each other in different ways that will be described herein below.

An acceptable or good quality of the process water is present if the bacteria growth over time is low. Such process water is suitable for storing in a tank for later use. An unacceptable or poor quality of the process water is present if the bacteria growth in the water over time is high. Therefore, a predetermined threshold value is set for the quality of the process water to be complied with such that a decision may be taken on when to save process water for later use or not. The predetermined threshold value may relate to one or several parameters that may be relevant when determining the quality of the process water. For example, a predetermined threshold value may comprise information about the type of detergent used and the amount of detergent dosed in the process water. To comply with this exemplified threshold value, a specified type of detergent must be detected and at a specified amount. In another example, a predetermined threshold value may comprise information about the type of detergent used, the amount of detergent dosed and the amount of soil in the process water. To comply with this further exemplified threshold value, a specified type of detergent must be detected and at a specified amount together with a maximum amount of soil in the process water. When the sensor unit output value complies with the predetermined threshold value related to the quality of the process water the decision to save at least an amount of the process water in the tank is taken.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
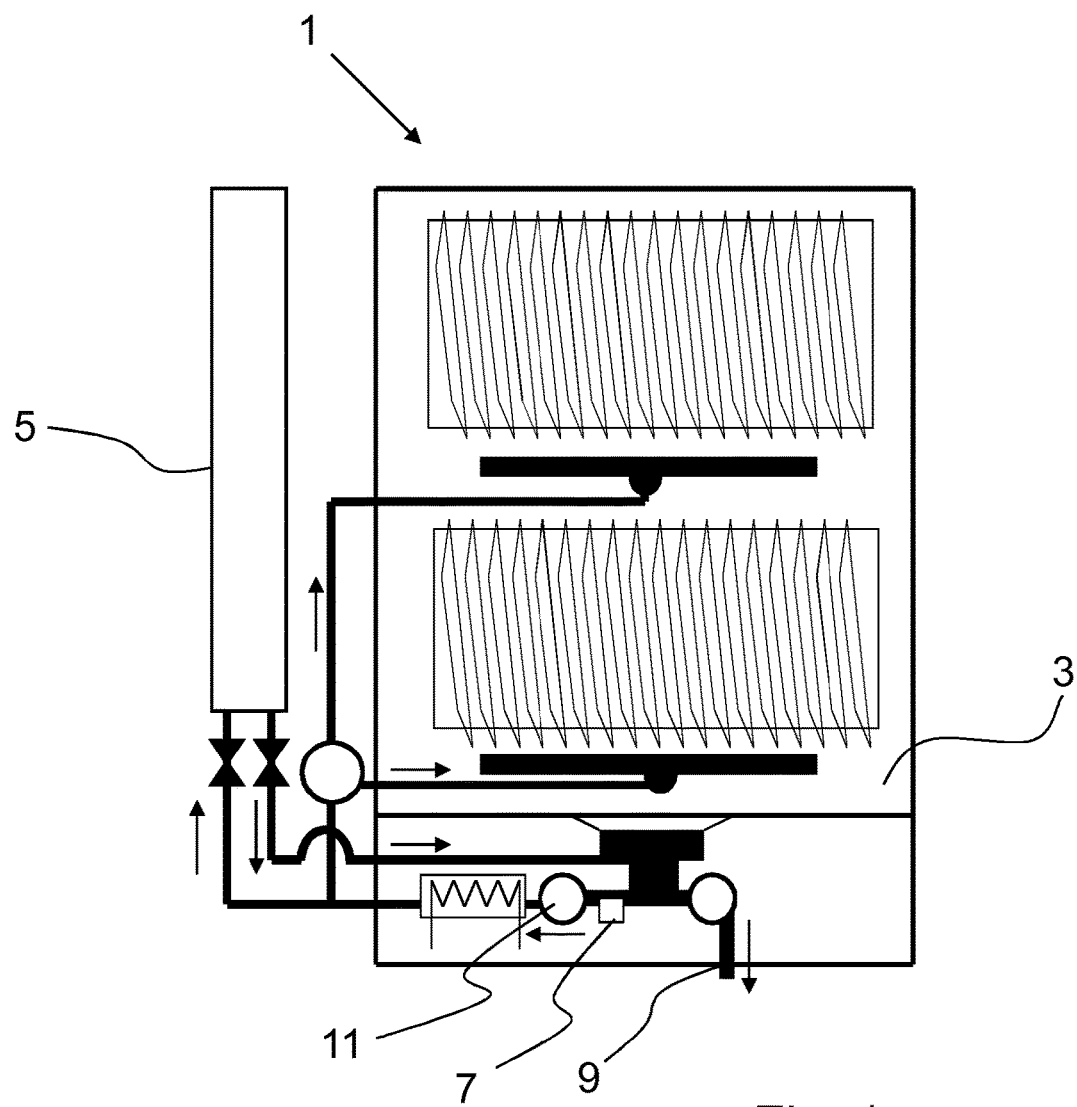
FIG. 1 is a schematic illustration of a household appliance, i.e. a dishwasher, according to an embodiment.

The present invention will now be described more fully with reference to the accompanying drawings, in which example embodiments are shown. However, this invention should not be construed as limited to the embodiments set forth herein. Disclosed features of example embodiments may be combined as readily understood by one of ordinary skill in the art to which this invention belongs. Throughout the following description similar reference numerals have been used to denote similar elements, parts, items or features, when applicable.

FIG. 1 illustrates a household appliance 1, i.e. a dishwasher. The dishwasher comprises a wash tub 3 for receiving goods to be washed therein. The dishwasher is provided with a tank 5 for storing at least a part of the rinse water from a cold rinse cycle or a hot rinse cycle. A sensor unit 7 is provided in the dishwasher to carry out measurements and/or detections on the process water in the appliance. The sensor may detect the type of detergent being used. The sensor unit may further measure the amount of detergent in the process water circulating in the household appliance. In an embodiment, the detergent dosed by the consumer is measured. This measurement is performed by performing the measurement as soon as the main wash cycle has started as it is at that point the detergent is released from the dosing chamber and then dissolves in the process water. The sensor unit may further measure the amount of soil in the process water. The sensor unit is positioned in the sump or in the piping just before the pump distributing the process water out to the wash arms in the wash tub.

The sensor unit 7 may comprise one or more sensors (not shown). Any sensor system that can detect and quantify presence of detergents or soils in aqueous solution directly or by correlation is in principle applicable, e.g. based on optical (UV/VIS/IR) absorption or fluorescence, surface tension, density, pH, as well as electronic tongues. The sensor unit output values provide a useful understanding of the process water quality. Preferably the sensor may be a conductivity sensor or a turbidity sensor. It may as well be a combined conductivity/turbidity sensor. When the sensor has recognised the type and/or amount of detergent and compared it to a predetermined threshold value, the dishwasher decides if the process water from a rinse cycle should be stored or not. Decision logic can be implemented as part of the electronic hardware of the sensor or be a part of a control unit or main board of the appliance or be entirely software based or a combination thereof.

The measuring or sensing may take place at certain occasions during a wash program or be a continuous process such that the turbidity and/or conductivity of the process water are constantly monitored. A comparison takes place wherein at least one sensor unit output value is compared with a predetermined threshold value related to the quality of the process water, and if the sensor unit output value complies with the predetermined threshold value related to the quality of the process water, at least a part of the process water is stored. Process water is then pumped by a pump 11 to the tank 5. The purpose of storing at least parts of the process water is to let it be re-used in a following program cycle.

In a water consuming household appliance different wash programs are available, of which each program performs a number of cycles. In a dishwasher, the available cycles may be a main wash, cold rinse and optionally a hot rinse. A pre-wash may also be available. The sensor or sensors may perform measurements in any of the cycles in a wash program cycle. Measurements may also be preformed continuously during a wash program.

Figure 2:
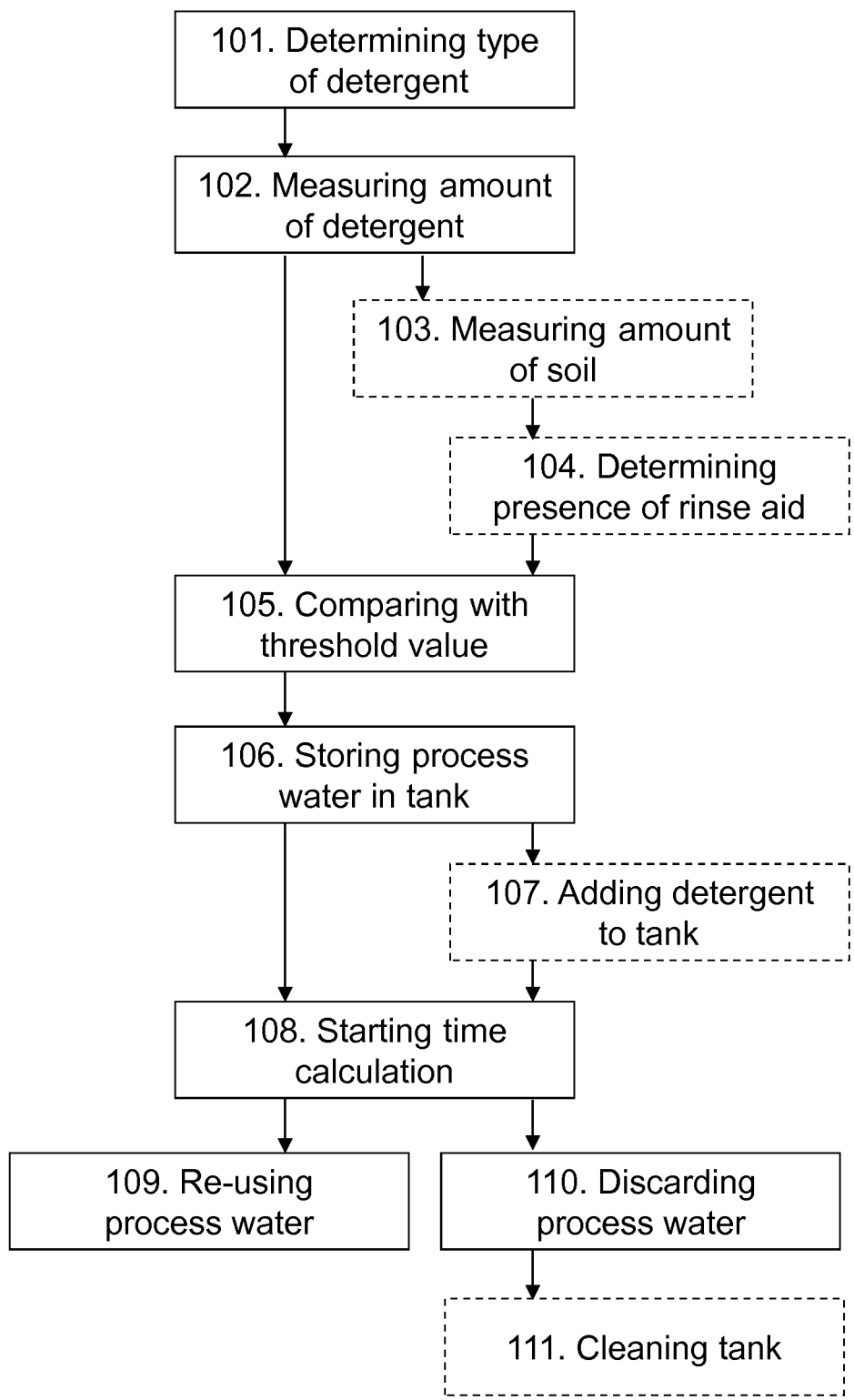
FIG. 2 shows a flow chart of a method in a water consuming household appliance according to an embodiment.

FIG. 2 is a flow chart illustrating a method for re-use of process water in a household appliance. The method steps for the handling of process water in a household appliance being a dishwasher will now be described with reference to FIG. 2.

101. Determining with a sensor unit the type of detergent used.

102. Measuring the amount of detergent in the process water.

105. Comparing at least one sensor unit output value with a threshold value.

107. Storing the process water from a rinse cycle when the sensor unit output value complies with the predetermined threshold value related to the quality of the process water.

According to an embodiment of the method, at least one measurement is performed with a sensor unit on the process water. Input from the sensor unit is used in the step of comparing the measured value with a predetermined threshold value. In this embodiment the sensor measures the amount of detergent present in the process water at different occasions during a wash program. Further, the type of the detergent, i.e. powder, tablet, gel or liquid is also determined with the sensor unit. A conductivity sensor may be used for this purpose. The conductivity value is related to the amount of detergent in the water. The conductivity value may also be related to the type of detergent used. A sensor unit output value is then in a following method step compared to a threshold value for the type of detergent in question. The threshold value may also be related to the amount of detergent dosed. Thus, the sensor unit output value complies with the threshold value when it is determined that the detergent is of powder or tablet type of a sufficient amount. The measurements may be performed in the beginning of the main wash as it is then the detergent is released into the process water and starts to dissolve therein. In another embodiment the threshold value may be related to the amount of residual detergent in a rinse cycle. In the step of comparing the measured value or values with one or more threshold values, a decision is taken to store the process water from a rinse cycle if the sensor unit output value complies with threshold value. As the decision to store process water in the tank has been taken, a time calculation is triggered to start.

In another embodiment the method comprises a further step of:

108. Starting a time calculation

The experimental data has shown that the quality of the water that is stored will change over time. Therefore, a time limit may be set as for how long the water stored in the tank should be stored before it is used in a following cycle. In tests it has been verified that process water, depending on its quality, may be stored in the tank up to 5 days before bacteria growth starts to reach levels that may affect the stored water. However, an average storage time may be set to 48 hours.

Depending on for how long time the process water has been stored, there are two alternatives for the next and final step:

109. Re-using the stored process water in a following cycle, or

110. Discarding the stored process water via drain outlet.

If a new wash program is initiated before the time limit for the stored water has passed, the stored water will be re-used in a pre-wash cycle or in a main wash cycle in accordance with a following method step 108. However, if the time limit is passed the stored water will be discarded through an outlet drain 9 in the dishwasher. In such a case main wash water or fresh water may be circulated through the tank to clean it from any residues that perhaps remains in the tank after it has been emptied.

In a further embodiment one or more further measuring steps may be performed. These steps are:

103. Measuring the amount of soil in the process water.

104. Detecting the presence of rinse aid in the process water

Under certain circumstances it may be possible to save the hot rinse process water or a combination of the cold rinse and hot rinse process water. To be able to detect and verify these conditions further measuring steps may be carried out. Here the amount of soil in the process water and also the presence of rinse aid may be taken into account.

In a still further embodiment it is possible to dose small amounts of detergent into the stored process water in the tank.

This further method step comprises:

107. Adding an amount of detergent into the tank holding stored process water.

The decision to add an amount of detergent directly into the tank may be taken if the system has been set to store at least a part of the process water from a cold rinse or hot rinse cycle even if it has been detected that the amount of residual detergent is not enough or if the type of detergent is not suitable. This method step may be provided in certain embodiments.

In a still further embodiment the tank is cleaned or rinsed after the stored process water has been discarded.

This further method step comprises:

111. Cleaning the tank by circulating process water from a main wash cycle and/or circulating fresh water through the tank.

This step 111 may be preformed to remove any residuals that may be left in the tank after it has been emptied. This tank cleaning step is preferably performed after discarding stored water due to that it had been stored over the predetermined storage. However, it may also be possible to perform this cleaning step at other occasions when the tank is empty.

In Table 1 below it is shown the recommended storage time (in hours) of the process water depending on the type and amount of detergent dosed for cold rinse water and hot rinse water respectively. Rinse aid (RA) is added in two of the examples.

TABLE 1

| Recommended storage time [h] at 30° C. | | | | | |
|---|---|---|---|---|---|
| | Detergent dosed [g] | | | | |
| | 0 | 30 (gel) | 10 (powder) | 10 + RA (powder) | 21.5 (tablet) | 40 + RA (powder) |
| Cold rinse [h] | 6 | <6 | 6 | 6 | 60 | >144 |
| Hot rinse [h] | 12 | <6 | 28 | 60 | 37 | >144 |

Typical detergent products, such as powder detergents or tablets, used for automatic dishwashing or in a washing machine have an inhibiting effect on bacterial growth already at dosage levels below those recommended. Dosage levels recognized as suitable for safe storage of process water from a rinse cycle of approximately 5 days are more than 20 grams of detergent, which is the average weight of a tablet. Typical recommended dose is in the range of 20-40 grams of detergent. Experimental results showed that storage of the cold rinse water is particularly appealing for storing in the tank as it contains more residual detergent compared to the hot rinse water. The higher residual detergent guarantees a longer safe storage time both in terms of bad smell formation and of bacterial proliferation, which two aspects are correlated. Liquid detergents with bleach-free formulations are however not effective in preventing bacterial growth in stored rinse water. The presence of liquid detergents is distinguishable from the presence of powder formulations through conductivity and/or turbidity measurements.

Depending on the type of wash program selected and on the particular conditions present with regard to for example the amount and/or type of detergent used, the amount of soil, the presence of rinse aid etc, various types of combinations of the cold rinse and the hot rinse to be stored are possible. A high level of both the amount of residual detergent and amount of soil in the process water indicates that the storage of predominantly the cold rinse water is preferred. The reason for this is that the high amount of residual detergent will have an inhibiting effect on the growth of any bacteria. Further, when the soil level is high and it is known that a predetermined dose of rinse aid has been used, the predominantly storage of hot rinse is preferred. The reason for that is that the use of a sufficient amount of rinse aid will have an inhibiting effect on the bacterial growth.

Therefore, the conditions to be verified as to determine the quality of the process water for storage and re-use of hot rinse in addition to cold rinse are:

low amount of soil in the two rinses sufficient amount of residual detergent from the main wash in the two rinses, and presence of rinse aid (RA) in the hot rinse.

The amount of soil and amount of residual detergent in the process water may be determined by comparing measured values from a sensor input. The amount of rinse aid may be detected with the same sensor unit but also by feed back information from the rinse aid dispenser arranged in the dishwasher. Such feed back information may comprise information about the rinse aid dispenser being filled or emptied, activation of a tablet function, i.e. adapting the wash programs to multifunctional tablets, etc.

Further modifications of the invention within the scope of the protection sought may be realized by a person skilled in the art. For example, the household appliance may be provided with one or more tanks for storing process water. Further, the sensor unit or separate sensors may be arranged at several suitable positions within a household appliance for performing measurements on the process water. Depending on the type of wash program selected, the measurements performed as well as the determinations performed may be carried out at specific occasions during a wash cycle as well as continuously during the separate cycles.

The invention claimed is:

1. A method of handling process water in a household appliance for washing and rinsing goods, the household appliance comprises a wash tub for performing wash program cycles and a tank for storing process water to be re-used in a following program cycle, the method comprising the steps of:

determining a type of detergent used in the household appliance with a sensor unit, measuring the amount of detergent in the process water with the sensor unit, comparing at least one sensor unit output value with a predetermined threshold value related to the quality of the process water, wherein the predetermined threshold is based upon a threshold degree of bacterial growth in the process water, and after determining that the at least one sensor unit output value complies with the predetermined threshold value related to the quality of the process water, pumping at least a part of the process water from a rinse cycle to the tank.

2. The method according to claim 1, wherein the method comprises the further step of
adding an amount of the detergent to the water tank comprising stored process water.

3. The method according to claim 1, wherein the method comprises the further step of
reusing the process water stored in the tank in a following program cycle being a pre-wash cycle or a main wash cycle.

4. The method according to claim 1, wherein the method comprises further step of
discarding process water stored in the tank after a predetermined time has passed.

5. The method according to claim 1, wherein the method comprises the further step of
cleaning the tank by circulating process water from a main wash cycle and/or fresh water through the tank.

6. The method of claim 1, wherein measuring the amount of detergent in the process water with the sensor unit comprises continuously monitoring the amount of detergent during a wash program.

7. The method of claim 1, wherein the predetermined threshold value requires the detergent to be of only powder or tablet type.

8. The method of claim 1, wherein the detergent is a cleaning detergent used during a wash cycle of the program cycle of the appliance before a rinse cycle of the appliance.

9. The method of claim 1, wherein the predetermined threshold comprises a minimum amount of detergent to cause the threshold degree of bacterial growth in the process water.

10. The method of claim 1, further comprising reusing the process water stored in the tank in a following program cycle being a pre-wash cycle or a main wash cycle, and adding additional detergent to the wash tub of the household appliance.

11. The method according to claim 1, wherein the method also comprises the step of
measuring the amount of soil in the process water with the sensor unit.

12. The method according to claim 11, wherein the predetermined threshold value further comprises information related to the amount of soil in the process water.

13. The method according to claim 1, wherein the method comprises the step of
determining the presence of rinse aid in the process water.

14. The method according to claim 13, wherein the predetermined threshold value further comprises information related to the presence of rinse aid in the process water of a hot rinse cycle.

15. The method according to claim 1, wherein the method comprises the further step of
starting a time calculation when process water to be stored is pumped to the tank.

16. The method according to claim 15, wherein the process water being stored in the tank is discarded when more than 48 hours have passed since the start of the time calculation.

17. The method according to claim 1, wherein the predetermined threshold value comprises information related to the amount of detergent dosed of the determined type.

18. The method of claim 17, wherein the predetermined threshold value is further dependent upon the temperature of the process water.

19. The method of claim 18, wherein the predetermined threshold value is inversely related to the temperature of the process water.

20. The method of claim 19, wherein when the process water is from a hot rinse, the predetermined threshold requires the presence of rinse aid in the process water.

* * * * *